UNITED STATES PATENT OFFICE.

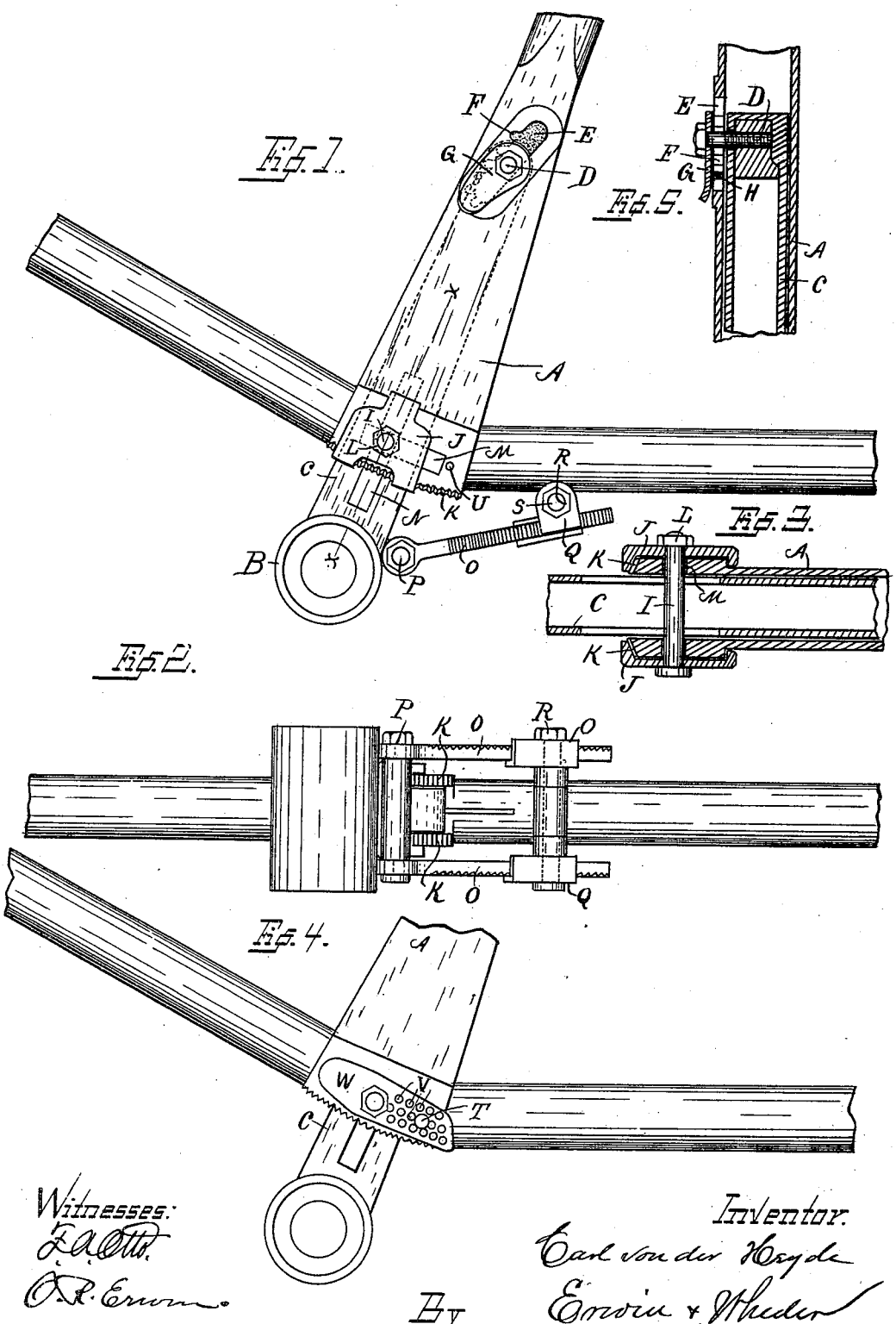

CARL VON DER HEYDE, OF MILWAUKEE, WISCONSIN.

ADJUSTABLE CRANK-HANGER FOR BICYCLES.

SPECIFICATION forming part of Letters Patent No. 666,445, dated January 22, 1901.

Application filed April 2, 1900. Serial No. 11,072. (No model.)

*To all whom it may concern:*

Be it known that I, CARL VON DER HEYDE, a citizen of the United States, residing at Milwaukee, county of Milwaukee, and State of Wisconsin, have invented new and useful Improvements in Adjustable Crank-Hangers for Bicycles, of which the following is a specification.

The object of my invention is to provide an improved device for adjusting the crank-hanger of a bicycle both horizontally and vertically in relation to the lower end of the seat-post.

The construction of my device is explained by reference to the accompanying drawings, in which—

Figure 1 represents a side view of my adjusting device. Fig. 2 is a bottom view of the device shown in Fig. 1. Fig. 3 is a vertical section drawn on line X X of Fig. 1. Fig. 4 is a modified form of the adjusting device shown in Fig. 1. Fig. 5 is a vertical section of the upper part of Fig. 1, drawn at right angles thereto.

Like parts are identified by the same reference-letters throughout the several views.

A represents the lower end of the saddle-post.

B represents the crank-hanger, which is provided with an upwardly-extending shank C. The upper end of the shank C is supported from the saddle-post by the pin D, one end of which protrudes through the slot E and is provided with the pawl G, on the side of which is an inwardly-projecting lug H, which is adapted to engage in one of the series of notches or recesses F formed in the edge of the slot E, whereby it is obvious that when desirous to adjust the hanger B higher or lower the lug H is moved from one of said notches to the other until the required adjustment is attained, when the shank C is locked at such point of adjustment by the clamping-bolt I. (Shown in Figs. 1 and 3.)

J J are clamping-plates which are held in contact with the lower end of the saddle-post A by the bolt I. The lower edges of said plates are notched or serrated, so as to engage in the serrated bearings K, formed at the lower end of said saddle-post, whereby when the nut L is turned down on said bolt I said clamping-plates J are drawn toward each other and their serrated edges are caused to engage in the serrated bearings K of said saddle-post, whereby said crank-hanger and shank C may be locked at any desired angle to the vertical axis of said saddle-post corresponding with the distance between said bearings K. Thus it is obvious that the crank-hanger may be adjusted vertically at any desired point within and corresponding with the length of the slot E, and the horizontal adjustment may be varied to any desired point within and corresponding to the length of the slot M.

The shank C is provided with the slot N for the reception of the clamping-bolt I, which permits of the vertical adjustment of said shank.

O O are brace-rods which are pivoted at one end to the shank C of the crank-hanger upon the bolt P, while their opposite ends are engaged between the respective pairs of clamping-plates Q Q. One side of each of said brace-rods O is provided with corrugations, while one of each of said pairs of clamping-plates is provided with corresponding corrugations which engage in those of said brace-rods, whereby as the nut R is turned down on the bolt S said clamping-plates engage said brace-rods and hold them rigidly at any desired point of adjustment.

In the modified form of the device (shown in Fig. 4) the brace-rods O, clamping-plates Q, clamping-plates J, and serrated bearings K may be dispensed with, and the horizontal adjustment of the shank C with the hanger B is accomplished by a single pin T, which is supported in the hole U, formed in the respective sides the saddle-post A, and engages within the saddle-post in one of the numerous holes V formed in the adjusting-plate W, which adjusting-plate W is secured to the shank C by the clamping-bolt I. The several series of holes V are provided one above another at intermediate points between the bolt I and the end of said plate W to enable me to produce a nicer adjustment than could be obtained with a single series of said holes, as the holes in one series are arranged at intermediate points with the holes of the other series, whereby any desired adjustment of said hanger may be attained.

Having thus described my invention, what

I claim as new, and desire to secure by Letters Patent, is—

1. In a bicycle-frame, the combination of a saddle-post, provided with a longitudinal slot in the edge of which is formed a series of notches or recesses; a crank-hanger bearing provided with a supporting-shank, pivoted at its upper end within the walls of said saddle-post upon a pin, one end of which protrudes through said slot; a pawl pivoted upon said pin and provided with a lug adapted to engage in said notches or recesses, and hold said posts at the desired point of adjustment; a clamping-bolt located between said pivotal supporting-bolt and the crank-hanger bearings at the lower end of said saddle-post; means for adjusting said crank-hanger bearings laterally in relation to the longitudinal axis of said saddle-post; and means for locking the same at the desired point of adjustment, substantially as and for the purpose specified.

2. In a bicycle-frame, the combination of a saddle-post; a crank-hanger bearing provided with a supporting-shank, pivoted at its upper end within the walls of said post, upon a vertical adjustable bolt; means for locking said adjustable bolt at the desired point of adjustment; a clamping-bolt located between said pivotal supporting-bolt and the crank-hanger bearings; clamping-plates supported from said clamping-bolt, said plates being provided with corrugated bearings, adapted to engage in corresponding corrugated bearings, formed in the lower end of said saddle-post; two brace-rods respectively pivoted at one end to the lower end of said shank and engaged at their opposite ends between a pair of brace-supporting clamping-plates; brace-supporting clamping-plates supported from one of the horizontal pieces of the bicycle-frame and a clamping-bolt passing through said plates, and adapted to clamp said brace-rods therein, substantially as and for the purpose set forth.

3. In a bicycle-frame, the combination of the saddle-post A, provided with longitudinal slot E, in the edge of which is formed a series of notches or recesses F; crank-hanger bearings B; shank C affixed at its lower end to said crank-hanger bearings; supporting-pin D having bearings in said slot E; pawl G pivotally supported from said pin D, and provided with an inwardly-projecting lug H adapted to engage in one of the series of recesses F; clamping-bolt I located between said pivotal bolt or pin D and the crank-hanger bearings; clamping-plate J supported from said clamping-bolt, and provided with corrugations adapted to engage in corresponding corrugations formed in the lower end of the saddle-post; and two brace-rods O, O respectively pivoted at one end to the lower end of said shank C, and engaged at their opposite ends between the clamping-plates Q, whereby said crank-hanger may be secured at any desired point of adjustment, substantially as and for the purpose set forth.

In testimony whereof I affix my signature in the presence of two witnesses.

CARL VON DER HEYDE.

Witnesses:
JAS. B. ERWIN,
LEVERETT C. WHEELER.